United States Patent [19]

Kawahara et al.

[11] Patent Number: 4,692,815
[45] Date of Patent: Sep. 8, 1987

[54] PHOTOGRAPHING AND RECORDING METHOD AND APPARATUS FOR ELECTRONIC STILL PICTURE CAMERAS

[75] Inventors: Atsushi Kawahara, Kawasaki; Masaya Okita, Yokohama, both of Japan

[73] Assignee: Nippon Kogaku K.K., Tokyo, Japan

[21] Appl. No.: 921,844

[22] Filed: Oct. 23, 1986

Related U.S. Application Data

[63] Continuation of Ser. No. 634,409, Jul. 25, 1984, abandoned.

[30] Foreign Application Priority Data

Jul. 28, 1983 [JP] Japan .............................. 58-136749
Dec. 23, 1983 [JP] Japan .............................. 58-242102

[51] Int. Cl.$^4$ .............................................. H04N 5/781
[52] U.S. Cl. .................................... 358/335; 358/342; 358/906; 358/909; 360/35.1; 369/53
[58] Field of Search ............... 358/342, 335, 906, 909; 360/31, 33.1, 35.1, 69, 73; 369/32, 33, 53, 58

[56] References Cited

U.S. PATENT DOCUMENTS 4,544,959 10/1985 Kozuki et al. ..................... 360/33.1
4,570,188 2/1986 Ichiyanagi ..................... 360/35.1 X Primary Examiner—Robert L. Richardson
Attorney, Agent, or Firm—M. N. Meller

[57] ABSTRACT

A photographing and recording method and apparatus for an electronic still picture camera of the type in which an image is picked up by a combination of a mechanical or electrooptical shutter and an image pickup device and the resulting picture signal is recorded on a magnetic disk, eliminate any undesired power consumption due to the preliminary revolution of the magnetic disk. The revolution of the magnetic disk is started upon the depression of the shutter button and the revolution is controlled at a constant speed by a velocity servosystem. The phase of the vertical synchronizing signals for reading the signal charges from the image pickup device and recording the signal on the disk after the exposure is shifted with respect to the vertical synchronizing signals for the extraneous charge draining operation of the image pickup device before the exposure and the phase-shifted vertical signals are reset in response to the beginning of the next exposure thereby controlling the phase difference between the vertical synchronizing signals and the rotational period of the disk at a desired value.

5 Claims, 53 Drawing Figures

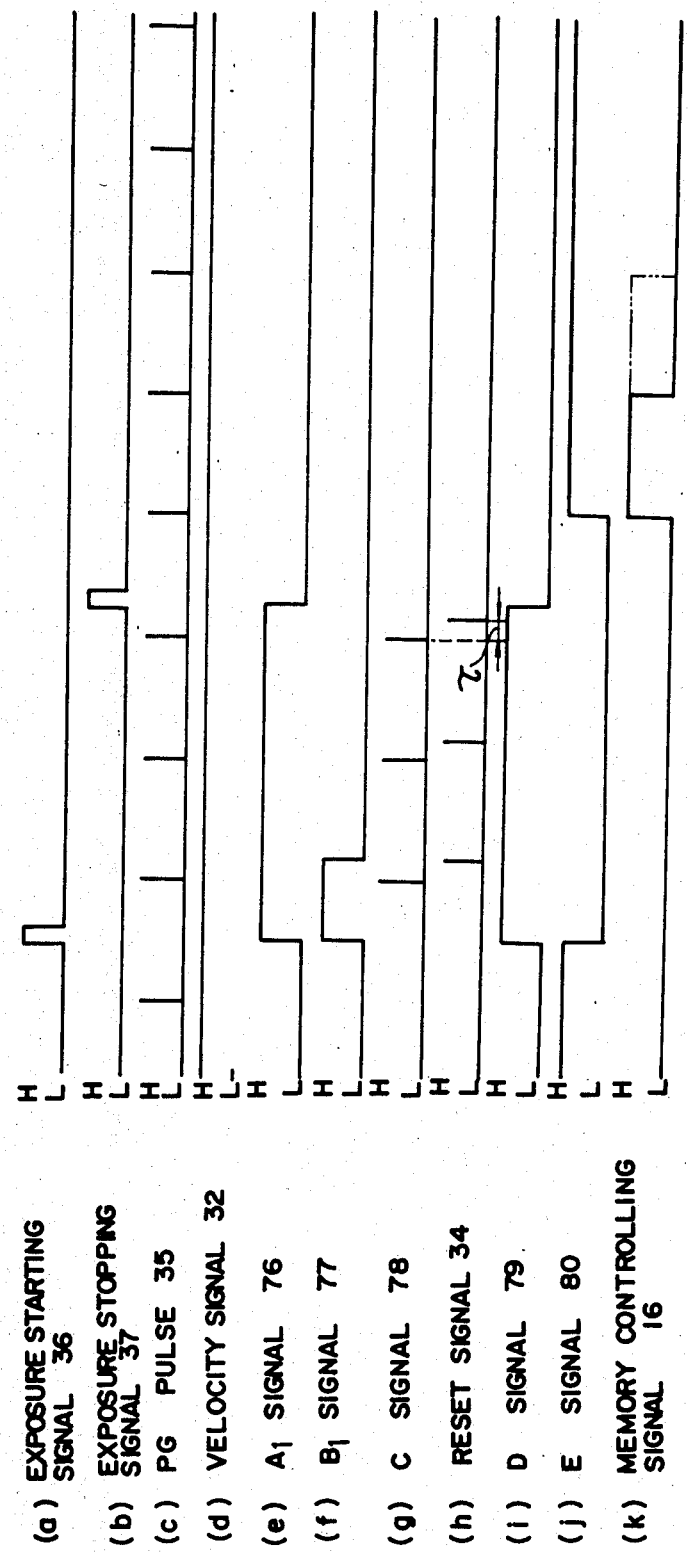

PHOTOGRAPHING AND RECORDING METHOD AND APPARATUS FOR ELECTRONIC STILL PICTURE CAMERAS

This application is a continuation of application Ser. No. 634,409, filed July 25, 1984, and now abandoned.

BACKGROUND OF THE INVENTION

The present invention relates to a photographing and recording method and apparatus for electronic still picture cameras.

Imaging an electronic still picture camera of the type in which the recording starting position of each of the tracks on concentric circles of a magnetic disk is adjusted to record a picture signal, during the recording the magnetic disk must be rotated at a predetermined revolution velocity locked in phase with the synchronizing signals. However, the time required for the disk to reach a predetermined revolution velocity after the start of its revolution is generally at least on the order of 0.5 second. In view of this fact, a method is conceivable in which a shutter button is operatively associated with switches arranged in two stages so that the first-stage switch is turned on by the half-depression of the button, thereby preliminarily starting the magnetic disk and after the magnetic disk has reached a predetermined constant revolution velocity, the second-stage switch is turned on by the full depression of the button, thereby starting the photographing and recording operation. With this type of electronic still picture camera, however, due to the annoyance of half-depressing tha shutter button and then waiting for the release of the shutter, the operator sometimes tends to half-depress the shutter button and wait in this condition for a chance to release the shutter. During this interval, the magnetic disk continues to rotate at the constant revolution velocity and the battery potential is consumed rapidly.

SUMMARY OF THE INVENTION

It is an object of the present invention to provide a photographing and recording method and apparatus for an electronic still picture camera, capable of providing reduced power consumption and rapid photographing performance.

Thus, the present invention features that upon the releasing operation of a shutter the revolution of a magnetic disk is started and the magnetic disk is rotated at a constant revolution velocity by a revolution velocity servo system, that the phase of the vertical synchronizing signals during the post-exposure period of reading the signal charges from a solid-state image pickup device and then recording the signal charges on the disk is shifted with respect to the phase of the vertical synchronizing signals during the preexposure draining operation of the extraneous charges of the image pickup device and that the shifted phase condition of the vertical synchronizing signals is reset in response to the start of the next exposure, thereby establishing a predetermined phase difference between the vertical synchronizing signals and the revolution of the disk.

BRIEF DESCRIPTION OF THE DRAWINGS

FIGS. 8(a) through 8(k) and FIGS. 9(a) through 9(k) depict timing charts for the camera of FIG. 7.

DESCRIPTION OF THE PREFERRED EMBODIMENTS

Figure 1:
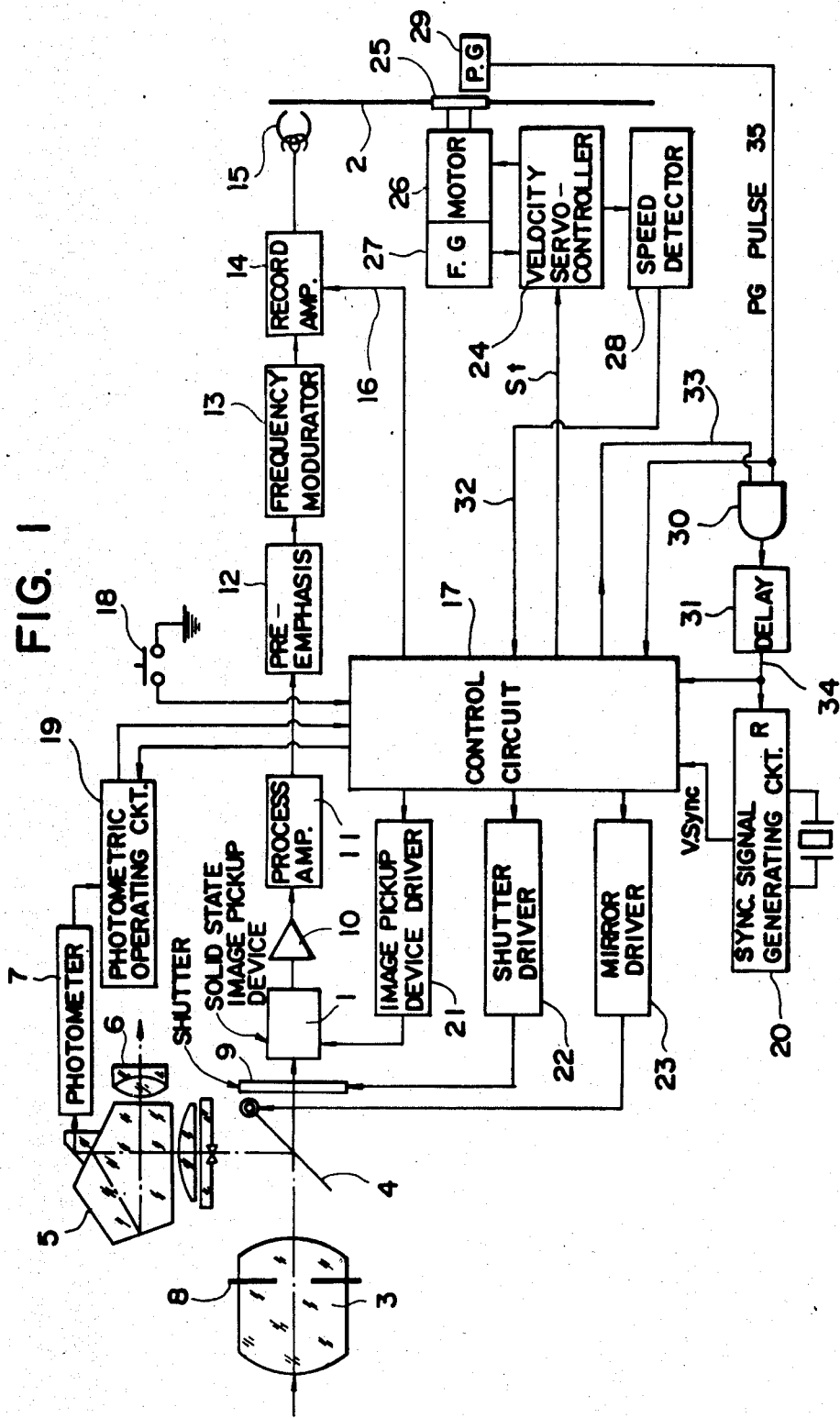
FIG. 1 is a block diagram showing an exemplary construction of an electronic still picture camera incorporating a method according to the present invention.

FIG. 1 is a block diagram showing an exemplary construction of an electronic still picture camera incorporating the present invention. In this electronic still picture camera, the beam of light introduced into the interior of the camera through a lens 3 is reflected by a quick return mirror 4 and it is directed to a viewfinder optical system including a pentagonal prism 5 and an eyepiece lens 6.

Arranged in a portion of the viewfinder optical system is a photometer device 7 and a photometric output is generated from a photometric operating circuit 19. Numeral 8 is an iris disposed within the lens barrel.

A focal-plane shutter 9 is arranged to the rear of the quick return mirror 4 and the picture signal generated from a solid-state image pick up device 1 is amplified by a preamplifier 10, FM modulated via a process amplifier 11 for presetting the γ characteristic, for example, a preemphasis circuit 12 and a frequency modulator circuit 13 and recorded on a magnetic disk 2 by a record amplifier 14 through a magnetic head 15. The record amplifier 14 has a control terminal so that only when a memory controlling signal 16 is applied to the control terminal, a current flows to the magnetic head 15 and the recording is effected. Thus, in other circumstances the recording is not effected even, for example, when the picture signal is present.

A control circuit 17 generates the required timing signals for the various component parts of the camera and it receives the ON signal from a release switch 18, the photometric output of the photometric operating circuit 9, etc., thereby generating the required control signals for the various parts by using the vertical synchronizing signals V.Sync and the horizontal synchronizing signals, which are not shown.

These control signals include for example, scan starting and stopping signals and synchronizing signals for an image pickup device driver circuit 21 which generates a group of pulses for the scanning of the image pickup device 1, front and rear panel release signals for a shutter driver circuit 22 for the focal-plane shutter 9 of the front and rear panel electromagnetic release type, mirror up and down signals for a mirror driver circuit 23 which springs up the quick return mirror 4 and returns it to the normal position at the expiration of a given time, a memory controlling signal for the record amplifier 14, a revolution start signal St for a disk velocity servo controller 24, and a reset timing signal 33 serving as a gate signal for the reset signals to a sync signal generating circuit 20.

The magnetic disk 2 is coupled to the shaft of a motor 26 through a hub 25 and it is driven into revolution by the motor 26. Connected directly to the motor 26 is a frequency generator 27 which generates, for example, 32 pulses for every motor revolution and its output is applied to the velocity servo controller 24, thereby effecting the desired velocity control. Also connected to the velocity servo controller 24 is a speed detector circuit 28 for detecting that the rotation speed of the motor 26 is within a predetermined range of speed errors to generate a velocity signal 32 which then goes to a H level. The camera further includes a pulse generator (PG 29) for generating a pulse for every revolution of the disk 2 so as to detect a specified circumferential position of the hub 25 and the time of generation of its output PG pulse 35 indicates a recording starting position.

An AND gate 30 receives the PG pulse 35 generated from the PG 29 for every revolution of the disk 2 and the reset timing signal 33 and the AND gate output is applied to a delay circuit 31. The delay circuit 31 delays a reset signal 34 applied to the control circuit 17 and the sync signal generating circuit 20 by a delay time $\tau$ substantially corresponding to several H periods (each H period is one horizontal scanning period). The sync signal generating circuit 20 is designed so that when the circuit 20 is reset by the reset signal 34, the generation of sync signals is started according to the sequence of its television system (e.g., the NTSC system) such as the leading edge of a vertical synchronizing signal. The reset timing signal 33 goes to the H level in response to the beginning of each exposure and it goes to an L level in response to the first pulse of the reset signal 34 after the transition of the constant velocity signal 32 to the H level.

With the construction shown in FIG. 1, the operation of the electronic still picture camera according to the present invention will now be described with reference to the timing chart of FIG. 2. Note that the high level of signals is indicated by a H level and the low level is indicated by an L level.

Figure 2:
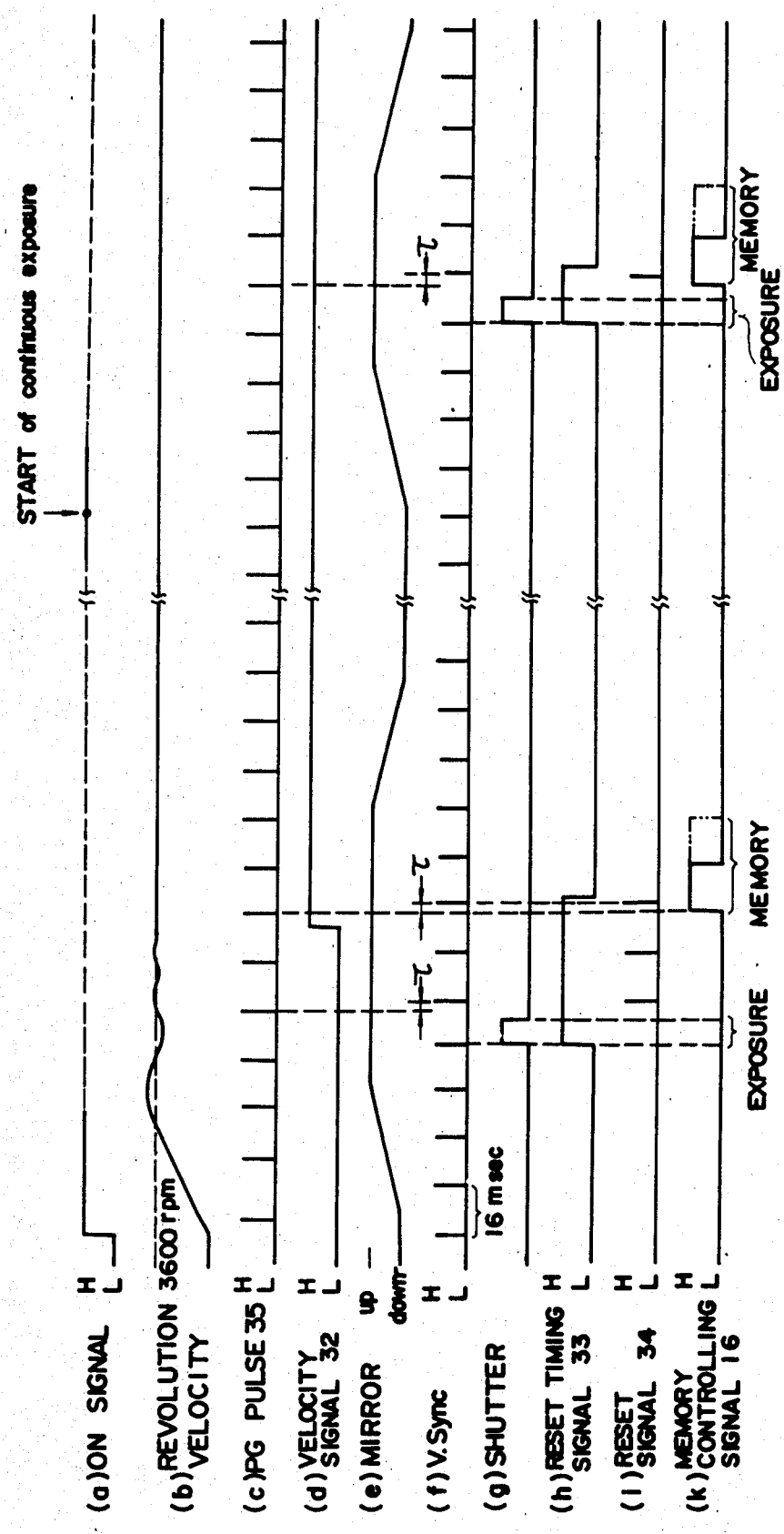
FIGS. 2(a) through 2(k) depict a timing chart for explaining the operation of the camera of FIG. 1.

Shown in (a) of FIG. 2 is the ON signal from the release switch 18. More specifically, when the release button is depressed so that the switch 18 is turned on, the ON signal goes to the H level as shown in (a) of FIG. 2 and the signal is applied to the control circuit 17, thereby starting the photographing and recording operation of the camera. Then, the illuminance of the photometer device 7 at the instant of the transition of the ON signal to the H level is stored in the photometric operating circuit 19, thus preparing it for use in the following control of the shutter speed.

Starting at the time that the release ON signal goes to the H level as shown in (a) of FIG. 2a, a revolution start signal St is applied to the velocity servo controller 24 and a mirror up signal is applied to the mirror driver circuit 23. Thus, the revolution of the disk 2 is started so that its revolution velocity attains a given velocity, e.g., a constant velocity of 3600 rpm as shown in (b) of FIG. 2, and the start of revolution causes the generation of PG pulses at the rate of one pulse per disk revolution as shown in (c) of FIG. 2 and the rise of the quick return mirror 4 to up as shown in (e) of FIG. 2. A time period corresponding to about 50 msec per three fields (16 msec per field) will be sufficient as the time required for the light beam to reach the shutter 9 due to the rise of the quick return mirror 4.

Also, during this interval the extraneous charges of the image pickup device 1 are drained by synchronizing signals in response to the turning-on of the release. In response to the H level of the first vertical synchronizing signal V. Sync after the mirror 4 has fully risen, the shutter 9 is opened and an exposure is made for the time corresponding to the preliminarily stored photometric value as shown in (g) of FIG. 2. During the exposure the image pickup device 1 stores signal charges.

At the instant that the shutter 9 is opened the reset timing signal 33 from the control circuit 17 goes to the H level as shown in (h) of FIG. 2 and it is applied to one input of the AND gate 30. As a result, the subsequently generated PG pulses 35 are passed through the AND gate 30 and further through the delay circuit 31, thus initiating the resetting of the sync signal generating circuit 20. The output of the delay circuit 31, i.e., the reset pulses, is shown in (i) of FIG. 2. The reset sync signal generating circuit 20 generates its vertical synchronizing signals V. Sync at the instant of the resetting as shown in (f) of FIG. 2. As a result, each vertical synchronizing signal V. Sync following the resetting is delayed by a time $\tau$ relative to the PG pulse 35. The time $\tau$ is selected to be equal to several times the horizontal scanning period, e.g., about 5 to 10 H as mentioned previously.

The disk 2 is subjected to only the velocity servocontrol and phase servocontrol is not provided. Thus, the time required for attaining the constant velocity is very short and the time can be reduced to about 100 msec. Thus, even if the previously mentioned exposure operation is performed before the disk reaches the predetermined constant velocity on the basis of an estimation, presuming that the disk eventually reaches the predetermined constant velocity, the signal charge retention time of the image pickup device 1 is so short that practically no difficulty is caused and the signal charges can be recorded before any deterioration of the signal by dark current or the like takes place. The constant velocity signal 32 of the disk 2 is shown in (d) of FIG. 2. This signal is generated from the speed detector circuit 28 provided as a part of the velocity servo controller 24 and it is designed to go to the H level when the disk 2 attains a revolution velocity substantially equal to the predetermined constant velocity. Since the recording can be effected properly after the constant velocity signal 32 has gone to the H level, the recording can be effected in response to the leading edge of the first PG pulse after the transition to the H level. This is indicated by the memory controlling signal 16 in (j) of FIG. 2.

In (j) of FIG. 2, the memory controlling signal 16 shows the recording of one field by the solid line. Also, the recording of one frame or two fields only requires that the signal be increased for an additional one field as shown by the two-dot chain line.

After the recording has been completed, the mirror 4 is immediately lowered as shown in (e) of FIG. 2 and a light image is again applied to the viewfinder. To make a continuous exposure, it is only necessary to provide detecting means to detect that the ON signal has gone to the H level at the expiration of a given time after the completion of the photographing of the first exposure or at the start of continuous exposure shown in (a) of FIG. 2 and the photographing and recording operation is repeated anew in response to each output of the detecting means.

From the operation point of view, though not shown, a selector switch for switching between the single exposure photographing and the continuous exposure may be conveniently provided so that the continuous exposure operation is performed when the continuous exposure is selected and the release button is depressed continuously. In the continuous exposure mode, whether the constant velocity revolution of the disk 2 is to be continued is determined at the start of continuous exposure upon the expiration of a given time after the completion of the photographing of each exposure so that the revolution is continued if the release ON signal is at the H level and the revolution is stopped if the signal is at the L level.

Since the disk 2 is already revolving at the constant velocity in the continuous exposure mode, the recording preparations are completed by the single reset pulse which differs from the case of the single exposure photographing.

In the above-description, the shutter opening timing is responsive to the high level of the first vertical synchronizing signal V.Sync generated at the expiration of a predetermined time after the turning-on of the release. However, the present invention is not limited to this and it is possible to design so that the exposure is started when the revolution of the disk 2 is started and a given revolution velocity lower than the final predetermined constant revolution velocity is reached or alternatively the length of this time interval is obtained and the time required to reach the final predetermined constant velocity therefrom is estimated, thereby determining the timing of the exposure.

Figure 3:
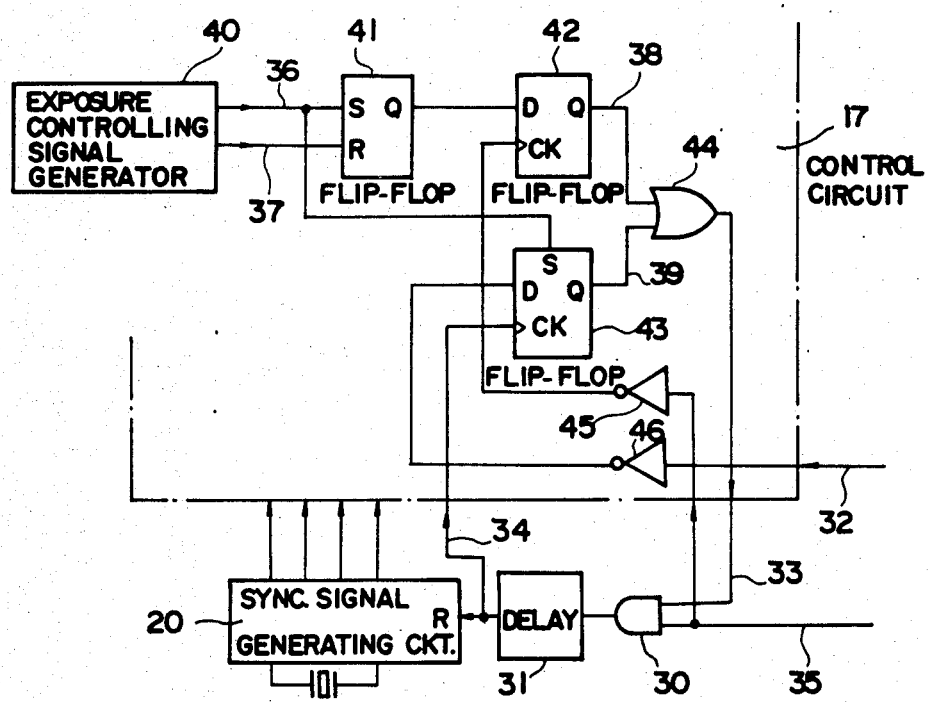
FIG. 3 is a block diagram showing the construction of a part of the control circuit.
Figure 4:
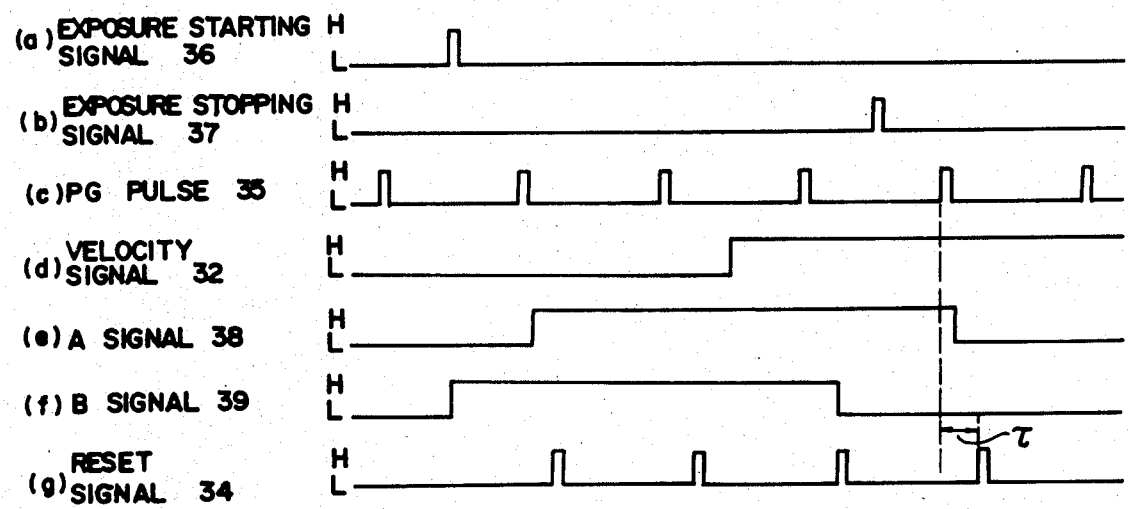
FIGS. 4(a) through 4(l) depict a timing chart for explaining the operation of the control circuit of FIG. 3.

Further, while FIG. 2 shows only the case where the shutter speed is fast, if the shutter speed is slow or the exposure time is long so that the predetermined constant revolution velocity is reached before the completion of the exposure, with a view to preventing the disk revolution from being disturbed by a disturbance or the like, it is desirable to design so that the reset timing signal 33 remains at the H level until the completion of the exposure and an embodiment of this type is shown in FIG. 3. FIG. 4 shows a plurality of waveforms for explaining the operation of the embodiment of FIG. 3.

In FIG. 3 the portion enclosed by a dot-and-dash line indicates a part of the control circuit 17 and the accessory circuits such as the power supply reset circuit, etc., are omitted for purposes of simplicity.

An exposure controlling signal generator 40 is responsive to the photometric output from the photometric operating circuit 19 to generate an exposure starting signal 36 and an exposure stopping signal 37, which are supplied to the shutter driver 22.

A flip-flop 41 and a D-type flip-flop 43 are each set by the exposure starting signal 36. Also, the flip-flop 41 is reset by the exposure stopping signal 37 and the Q output of the flip-flop 41 is applied to a D-type flip-flop 42. An inverted PG signal is applied to the clock terminal of the D-type flip-flop 42 and the reset signal 34 is applied to the D-type flip-flop 43. A gate 44 receives the A signal 38 from the D-type flip-flop 42 and the B signal 39 from the D-type flip-flop 43 to generate the reset timing signal 33.

The flip-flops 41 and 43 are set by the leading edge of the exposure starting signal 36 as shown in (a) of FIG. 4 and thus the B signal 39 goes to the H level as shown in (f) of FIG. 4. If the exposure time is short as in the case of FIG. 2 so that the flip-flop 41 is reset by the exposure stopping signal 37 before the application of an inverted PG signal through an inverter 45, the Q output of the flip-flop 42 or the A signal 38 remains at the L level. In the case of FIG. 4 where the exposure time is long, the A signal 38 shown in (e) of FIG. 4 goes to the H level by following the B signal 39 shown in (f) of FIG. 4. When the velocity signal 32 goes to the H level prior to the completion of the exposure as shown in (d) of FIG. 4, this is detected so that the flip-flop 43 is reset by the leading edge of the next reset signal 34 and its Q output or the B signal 39 goes to the L level as shown in (f) of FIG. 4. However, at this time the A signal 38 still remains at the H level and this state continues until the first PG pulse following the completion of the exposure is passed through the gate 30.

Thus, the reset is continued until the recording time after the completion of the exposure and the exact positional relation between the PG pulses 35 and the vertical synchronizing signals is maintained, thereby minimizing the irregularity of the revolution due to any disturbance.

Figure 5:
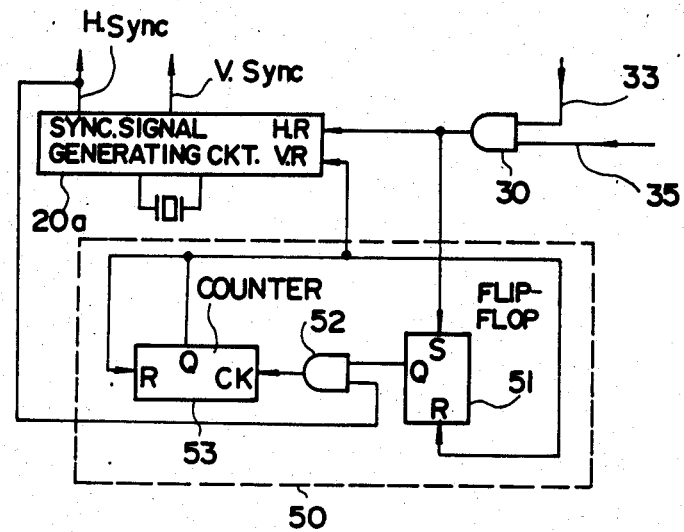
FIG. 5 is a block diagram showing an exemplary construction of the delay circuit used in the camera of FIG. 3.

FIG. 5 is a block diagram showing another exemplary construction of the delay circuit used with a sync signal generating circuit 20a which is constructed to separately reset a horizontal sync signal generator and a vertical sync signal generator.

In FIG. 5 the sync signal generating circuit 20a has a horizontal reset terminal H.R and a vertical reset terminal V.R and a portion 50 enclosed by the dotted line functions as the delay circuit.

In this case, the PG pulse 35 is passed without any delay through the AND gate 30 and applied to the horizontal reset terminal H.R. As a result, the horizontal synchronizing signals are first shifted in phase in response to the leading edge of the PG pulse 35. At the same time, the output of the AND gate 30 is applied to the set input of a flip-flop 51 so that its Q output goes to the H level and is applied to an AND gate 52. The horizontal synchronizing signals H.Sync are applied to the other input of the AND gate 52 and the output of the AND gate 52, i.e. the horizontal synchronizing signals H.Sync, for 7H are counted by a counter 53. When the signals for 7H are counted, the output of the counter 53 goes to the H level and the counter 53 and the flip-flop 51 are reset. Due to this construction, the counter 53 is stopped until the next PG pulse is generated through the gate 30.

The reset signal generated form the counter 53 is also applied to the vertical reset terminal V.R of the sync signal generating circuit 20a so that the vertical synchronizing signal is generated with a delay of about 7H from the PG pulse and in this way the desired operation is effected by the simple delay circuit.

The modification of the embodiment of FIG. 1 will now be described.

Figure 6:
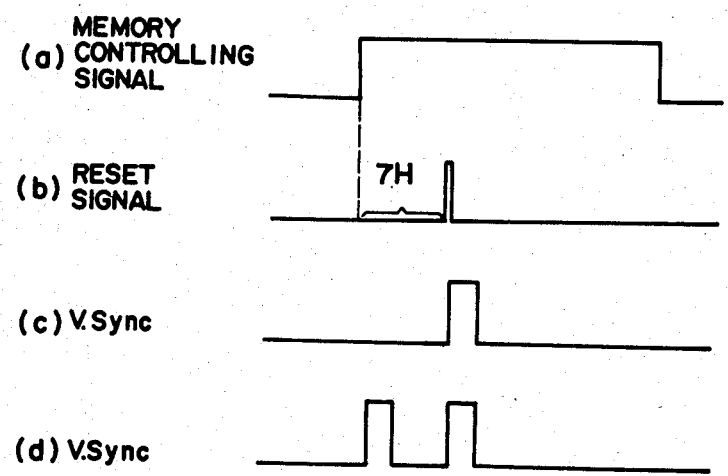
FIGS. 6(a) through 6(d) depict a diagram for explaining the operation of the electronic still picture camera of FIG. 1.

FIG. 6 shows a plurality of waveforms for explaining the operation of this modification. When the exposure is completed so that the memory controlling signal goes to the H level as shown in (a) of FIG. 6, after the expiration of a predetermined time (e.g., , 7H) the reset pulse goes to the H level as shown in (b) and the vertical synchronizing signal is shifted in phase as shown in (c), thereby establishing a predetermined phase relation between the disk revolution and the vertical synchronizing signals. In this case, if no synchronizing signal is applied during the interval between the positive transition of the memory controlling signal in (a) and the positive transition of the reset pulse in (b) as shown in (c), no inconvenience is caused. However, if a vertical synchronizing signal is generated during the interval between the positive transition of the memory controlling signal and the positive transition of the reset pulse as shown in (d), two vertical synchronizing signals are generated within the recording period of each field, thus causing an inconvenience.

Figure 7:
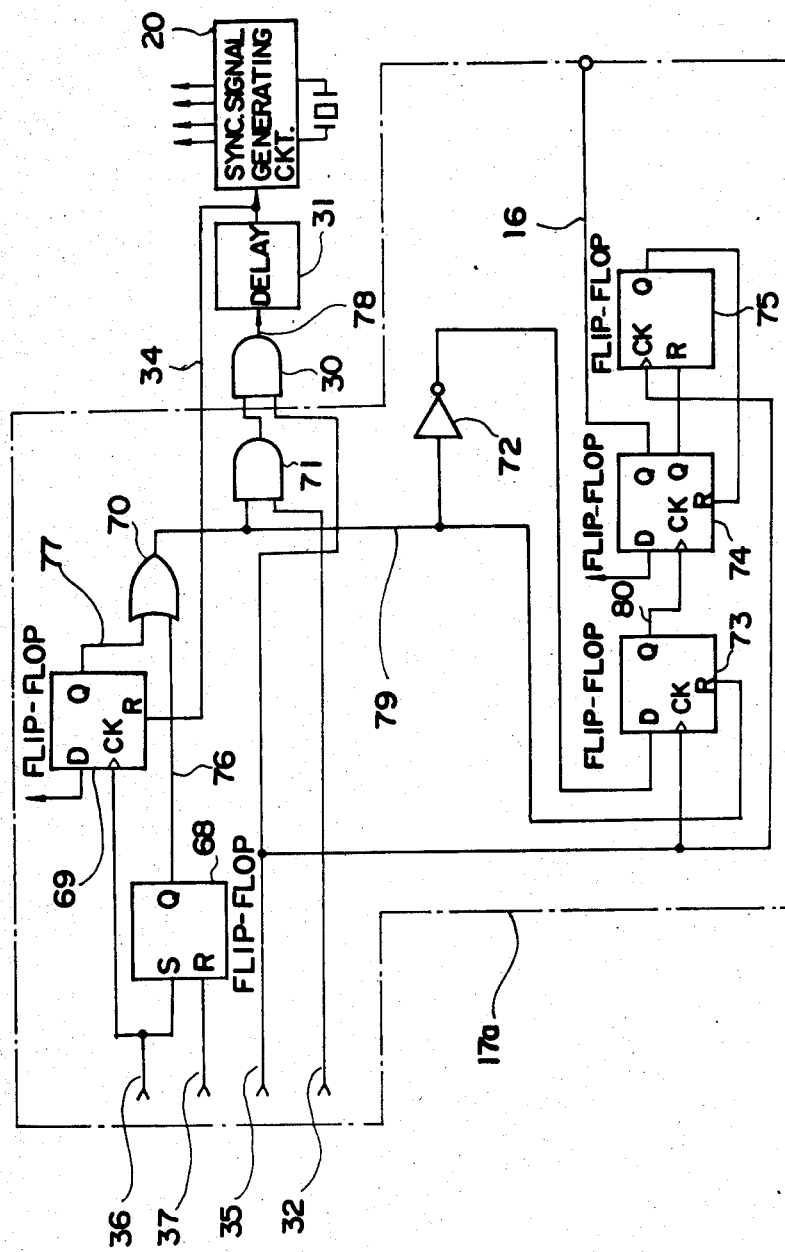
FIG. 7 is an electric circuit diagram showing a modified form of the electronic still picture camera of the invention shown in FIG. 1.
Figure 8:
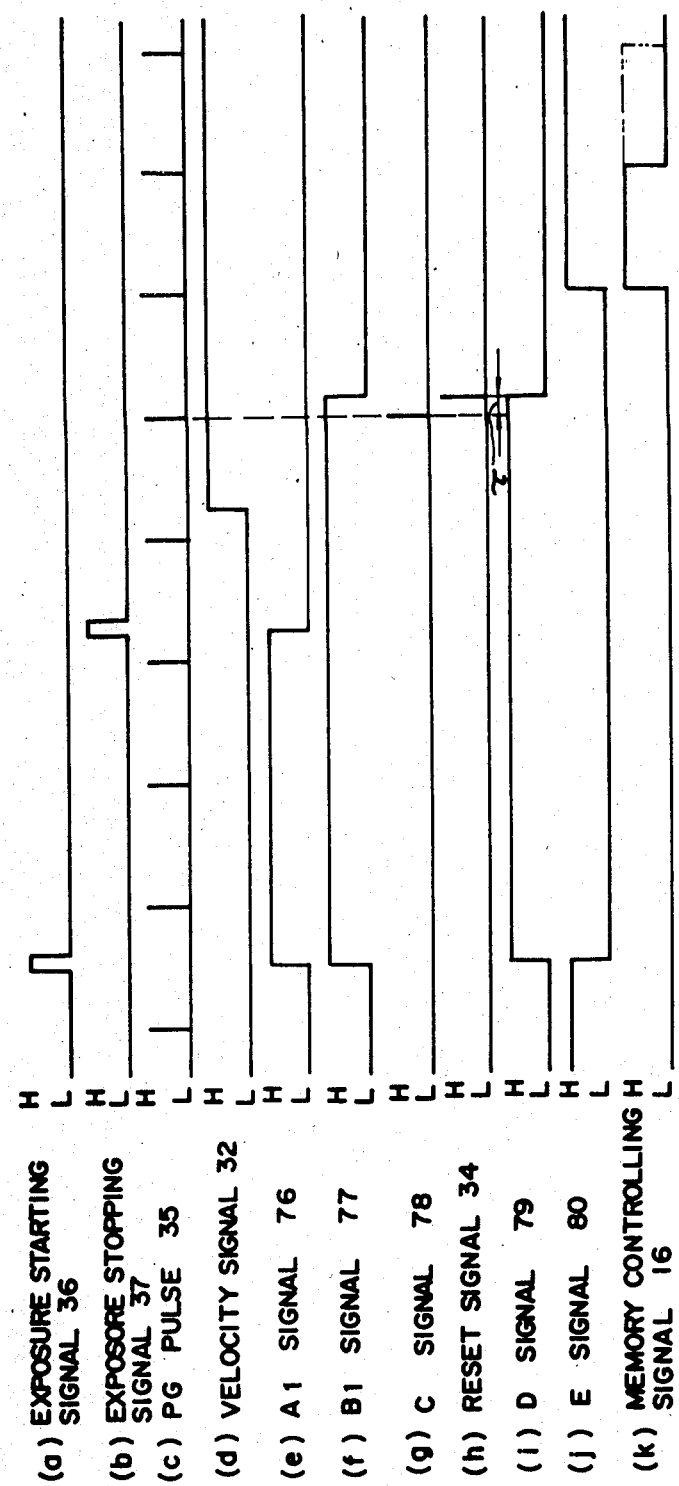

FIG. 7 is an exemplary circuit diagram of a control circuit 17a which is identical with the control circuit 17 of FIG. 1 except for the portion pertaining to the control of the reset signal 34, and FIGS. 8 and 9 are timing charts for explaining the operation of the circuit of FIG. 7.

Referring first to FIG. 7, an S-R flip-flop 68 is set by the exposure starting signal 36 and reset by the exposure stopping signal 37. The control circuit 17a includes D-type flip-flops 69, 73 and 74, an OR gate 70, an AND gate 71 for receiving the output of the OR gate 70 and the constant velocity signal 32, an inverter 72 for inverting the output of the AND gate 71 and a counter 75 for receiving the PG pulses 35 at its CK input. An H level signal is always applied to the D input of the D-type flip-flops 69 and 74.

The operation of the circuit of FIG. 7 will be described hereunder with reference to the timing charts of FIGS. 8 and 9.

Where the revolution velocity of the magnetic disk 2 has already attained the constant velocity during the exposure time of the image pickup device 1, the phase of the synchronizing signals is shifted in accordance with the phase of the PG signals 35 during the exposure time and the recording is effected immediately after the completion of the exposure. However, where the revolution of the magnetic disk 2 is stabilized after the completion of the exposure, it is necessary to shift the phase of the synchronizing signals after the revolution of the magnetic disk 2 has stabilized and then perform the recording.

FIG. 8 is a timing chart for the case where the motor attains the constant speed after the completion of the exposure.

In FIG. 8, the $A_1$ signal 76 from the S-R flip-flop 68 is at the H level during the exposure as shown in (e) of FIG. 8. The output $B_1$ signal 77 of the D-type flip-flop 69 is changed to the H level by the start of the exposure and is reset and changed to the L level upon the application of the reset signal 34 (see (h) of FIG. 8) to the sync signal generating circuit 20 as shown in (f) of FIG. 8. The OR gate 70 receives the $A_1$ signal 76 and the $B_1$ signal 77 and its output or D signal 79 remains at the H level until either the $A_1$ signal or the $B_1$ signal goes to the H level, that is, until the reset signal 34 is generated during the exposure or after the starting of the exposure as shown in (i) of FIG. 8. The AND gates 71 and 30 pass the PG pulses 35 (FIG. 8(c)) when the output 79 of the OR gate 70 and the velocity signal 32 (FIG. 8(d)) are both at the H level. Thus, in the case of FIG. 8 where the motor attains the constant speed after the completion of the exposure, after the constant speed has been reached, the reset signal 34 is generated by the first PG pulse 35 as shown in (h) of FIG. 8.

When the reset signal 34 is generated, the $B_1$ signal 77 from the D-type flip-flop 69 goes to the L level as shown in (f) of FIG. 8. Thus, where the motor 26 attains the constant speed after the completion of the exposure, only the single reset signal 34 is generated after the motor 26 has attained the constant speed.

FIG. 9 is a timing chart for the case where the motor 26 attains the constant speed before the exposure.

In this case, the AND gate 30 is opened during the exposure and its output C signal 78 consists of the PG pulses 35 passed therethrough during the interval as shown in (g) of FIG. 9. Each of the reset pulses 34 generated as shown in (h) of FIG. 9 by the signal 78 resets the sync signal generating circuit 20.

Thus, as will be seen from a comparison of FIGS. 8 and 9, when both the output of the S-R flip-flop 68 (i.e. the $A_1$ signal 76) and the output of the D-type flip flop 69 (i.e. the $B_1$ signal 77) go to the L level, that is, when the output of the OR gate 70 (i.e. the D signal) goes to the L level, the recording is enabled and the memory controlling signal 16 shown in (k) is generated so as to start the recording in response to the next PG signal 35.

In FIG. 7, the D-type flip-flop 73 receives the output E signal 80 from the inverter 72 (the inverted signal of the D signal 79) and is reset by the D signal 79. Thus, the memory controlling signal 16 shown in (k) is generated by the D-type flip-flop 73, the D-type flip-flop 74 and the counter 75. It is to be noted that in (k) of FIGS. 8 and 9 the solid line indicates the field recording and the broken line indicates the frame recording.

What is claimed is:

1. An apparatus for an electrical still picture camera including image pickup means for storing charges corresponding to an image of an object at a photosensitive surface and generating a picture signal indicative of said image, exposure means for controlling an exposure of said photosensitive surface by said image, first generating means for generating a vertical synchronizing signal, means for recording said picture signal on a disk in accordance with said vertical synchronizing signal, and a motor for rotating said disk, said apparatus comprising:
    (a) means for controlling said motor so that the period of the rotation of said disk substantially coincides with the period of said vertical synchronizing signal;
    (b) means for detecting that the period of the rotation of said disk substantially coincides with the period of said vertical synchronizing signal and for producing a detection signal;
    (c) second generating means connected to said motor for genreating a pulse every rotation of said disk: and
    (d) shifting means responsive to said detecting signal following a beginning of said exposure for causing for causing said first generating means to shift a phase of said vertical synchronizing signal for every pulse generated, said shifting means shifting the phase of said vertical synchronizing signal to produce a predetermined phase difference between said pulses and said vertical synchronizing signal.

2. An apparatus according to claim 1, wherein said shifting means comprises means for delaying each pulse for a predetermined period of time and outputting said delayed pulses to said first generating means.

3. An apparatus according to claim 2, wherein said predetermined period of time substantially corresponds with said predetermined phase difference.

4. An apparatus for an electrical still picture camera including image pickup means for storing charges corresponding to an image of an object at a photosensitive surface and generating a picture signal indicative of said image, exposure means for controlling an exposure of said photosensitive surface by said image; first generating means for generating a vertical synchronizing signal, means for recording said picture signal on a disk in accordance with said vertical synchronizing signal, and a motor for rotating said disk, said apparatus comprising:
- (a) means for controlling said motor so that the period of the rotation of said disk substantially coincides with the period of said vertical synchronizing signal;
- (b) second generating means for generating a terminal signal indicative of a termination of said exposure;
- (c) means for detecting that the period of the rotation of said disk substantially coincides with the period of said vertical syncrhonizing signal and for producing a detection signal;
- (d) third generating means connected to said motor for generating a pulse every rotation of said disk;
- (e) shifting means connected to said exposure means for causing said first generating means to shift a phase of said vertical synchronizing signal in response to said detection signal following a beginning of said exposure, said shifting means shifting the phase of said vertical syncrhonizing signal to produce a predetermined phase difference between said pulses and said vertical synchronizing signal; and
- (f) control means responsive to said detection signal and said terminal signal for controlling said third generating means, said control means controlling said third generating means in response to said detection signal after the generation of said terminal signal whereby the number of said pulses generated after the generation of said detection signal is limited to one, said control means inhibiting said third generating means from generating said pulse in response to said detection signal after the generation of said terminal signal.

5. An apparatus according to claim 4, wherein said shifting means comprises means for delaying each pulse for a predetermined period of time and outputting said delayed pulses to said first generating means.

* * * * *